3,142,649
NEUTRON RADIATION SHIELDING MATERIAL
Angel Alberto Blanco, Birmingham, England, assignor to Imperial Chemical Industries Limited, London, England, a corporation of Great Britain
No Drawing. Original application Dec. 28, 1959, Ser. No. 862,071, now Patent No. 3,106,535, dated Oct. 8, 1963. Divided and this application June 29, 1961, Ser. No. 120,525
Claims priority, application Great Britain Aug. 24, 1959
11 Claims. (Cl. 252—478)

This invention relates to neutron radiation shielding material and, more particularly, to an improved method of forming neutron radiation shields. Such shields are of particular use in the shielding of nuclear reactors on board sea-going vessels and in aircraft.

According to the invention, the composition of matter which is used in the shield is a composite material having neutron-absorbing properties comprising discrete chips of a solid material containing at least 3% of hydrogen by weight, in which particles of a neutron-absorbing material are dispersed, the chips being disposed in a matrix of material containing at least 3% by weight of hydrogen. The chips may, for example, be polythene, cured polyeseter or epoxy resins, nylon or polyethylene terephthalate. For many applications, the preferred shapes of the chips are those which provide the greatest voidage, e.g. short lengths of rod-like or tubular chips or small helices. For other applications, however, low voidage is desirable and spheroidal chips, for example, are preferably used. In this said form of the invention the matrix may consist of certain mineral oils, water, silicone fluids, ethylene glycol, polyester, polystyrene or epoxy type resins.

For convenience in forming the shield material in position on site it is necessary that the matrix is or can be rendered sufficiently flexible, plastic or fluid so as to enable it to be poured in position to fill the interstices between the discrete particles of neutron shielding material. It is not necessary, however, that the matrix should retain its fluidity at the working temperature.

Preferably the solid material is polyethylene or polystyrene or a cured resin such as a polyester or epoxide resin, it being essential that the solid material is one which can be brought, or has at some initial stage in its fabrication been brought, into a condition of sufficient fluidity as to enable the particles of a neutron-absorbing material, e.g. a boron or cadmium compound, to be dispersed therethrough. The choice of a particular material in which to embed the boron or cadmium compound will, in practice, depend upon the temperature at which the radiation shield prepared from such material is designed to operate; but it is desirable that the solid material remains solid at the temperature assumed by the shield under working conditions so keeping the absorbing material uniformly dispersed. An example of such a neutron absorbing composition conveniently comprises a hydro-carbon oil and chips of polythene containing 2% by weight of boric oxide.

Neutron radiation shields made from materials in accordance with the invention can be reinforced by means of loose fibers or woven material such as material made from glass fibers or material made from nylon, polyethylene terephthalate or cellulose fibers included in the matrix. The shielding material may also have fillers and reinforcing additions such as carbon in powder form, wood dust or aluminum powder or combinations thereof included in the matrix.

To improve the heat transfer properties of the radiation shield, a proportion of a suitable metallic powder, such as aluminum powder, may be dispersed throughout the solid material. Also, material capable of absorbing gamma radiation, e.g. lead or lead compounds, may be incorporated in the solid material.

As stated above, the neutron radiation shield makes use of a composition in the form of discrete chips of a solid material in which the neutron-absorbing material is embedded, the said chips being disposed in a matrix of a material containing at least 3% by weight of hydrogen. As materials for the matrix there may be used certain mineral oils, water or silicone fluids. For convenience in forming the shield in position on the site it is essential that the material forming the matrix can be rendered sufficiently fluid to enable it to be poured in position around the chips, although it is not necessary that such matrix material retains its fluidity at the working temperature. For use at relatively low temperatures, that is below the melting point of polythene, a material mentioned above consisting of a hydrocarbon oil and polythene chips containing 2% by weight of boric oxide may be used. Conveniently the chips can be loaded between liquid-impervious retaining walls surrounding the object to be shielded and the hydrocarbon oil added to fill the spaces between the chips. In general, for temperatures up to 120° C. the matrix material may be of paraffin wax, bitumen or natural or artificial rubber. For use at higher temperatures, e.g. 100 to 250° C., the chips are preferably composed of an epoxy-type or polyester resin in which the neutron-absorbing material is dispersed and the matrix material consists of a silicone fluid for example a methyl silicone fluid which has considerable flexibility when gelled.

Particularly satisfactory materials having neutron shielding properties are set out in the following examples:

(i) For use at low temperatures, e.g. 100° C., polythene in the form of small spheres (⅛ inch average diameter) is disposed in a mineral oil such as gas oil or a polyester or polystyrene resin.

(ii) For use at higher temperatures, e.g. 200° C., chips of nylon or polyethylene terephthalate are dispersed in a silicone fluid.

As stated earlier these solid chips contain additions of boron or cadmium or an oxide or carbonate thereof in order that the material can effectively absorb neutrons. Furthermore, they may contain additions of heavy elements such as lead, barium or iron or their compounds in order to provide effective absorption of gamma radiation.

This is a division of my application, Serial No. 862,071, filed December 28, 1959, now U.S. Patent No. 3,106,535.

What is claimed is:

1. A method of forming a neutron radiation shield comprising the steps of packing a hollow shape with discrete chips of a solid material, said solid material having finely divided particles of a neutron-absorbing material dispersed therethrough, and filling the air-spaces between said chips with a material which is fluid, at least while being poured into said air-spaces, to form a matrix about said chips, said matrix material containing at least 3% by weight of hydrogen.

2. A method of forming a neutron radiation shield comprising the steps of packing a hollow shape with discrete chips of a solid material containing at least 3% by weight of hydrogen, said solid material having finely divided particles of a neutron-absorbing material dispersed therethrough, and filling the air-spaces between said chips with a material which is fluid, at least while being poured into said air-spaces, to form a matrix about said chips, said matrix material containing at least 3% by weight of hydrogen.

3. The method of claim 2 in which the matrix material is selected from the group consisting of mineral oil, water, silicone fluid, ethylene glycol, polyester resin, polystyrene and epoxy type resin.

4. The method of claim 1 in which the solid material is polyethylene.

5. The method of claim 1 in which the solid material is nylon.

6. A method of forming a neutron radiation shield comprising the steps of packing a hollow shape with discrete chips of a solid material, said solid material comprising a mixture of a plastic material which is solid at the working temperature of the shield, and finely divided particles of another material, the plastic material having been rendered fluid at some stage and finally allowed to solidify so that the finely divided particles are dispersed throughout the solid mass, and filling the air-spaces between said chips with a material which is fluid, at least while being poured into said air-spaces, to form a matrix about said chips, said matrix material containing at least 3% by weight of hydrogen.

7. The method of claim 6 in which the plastic material is selected from the group consisting of polyethylene and nylon.

8. The method of claim 6 in which the finely divided material comprises a neutron absorber selected from the group consisting of boron, boron compounds, boron carbide and cadmium compounds.

9. The method of claim 6 in which the finely divided material is a gamma ray absorber selected from the group consisting of lead and lead compounds.

10. The method of claim 6 in which the finely divided material is aluminum.

11. The method of claim 2 in which particles of a neutron absorber are dispersed throughout the matrix material.

References Cited in the file of this patent

UNITED STATES PATENTS

| | | |
|---|---|---|
| 2,796,411 | Zirkle et al. | June 18, 1957 |
| 2,796,529 | Morrison | June 18, 1957 |
| 2,811,487 | Stanton | Oct. 29, 1957 |
| 2,853,624 | Wigner et al. | Sept. 23, 1958 |
| 2,858,451 | Silversher | Oct. 28, 1958 |
| 2,928,948 | Silversher | Mar. 15, 1960 |
| 2,961,415 | Axelrad | Nov. 22, 1960 |

FOREIGN PATENTS

| | | |
|---|---|---|
| 686,445 | Great Britain | Jan. 28, 1953 |

OTHER REFERENCES

AECU–1952, Elastomeric Materials for Shielding Compounds for Nuclear Reactors, 1952, page 10.